(12) United States Patent
Kirchner et al.

(10) Patent No.: US 6,932,107 B2
(45) Date of Patent: Aug. 23, 2005

(54) FLOW CONTROL VALVES

(75) Inventors: Mark W. Kirchner, Seattle, WA (US); Ben Trueblood, Woodinville, WA (US); Paul K. Skoglund, Medina, WA (US)

(73) Assignee: Flow Control Industries, Inc., Woodinville, WA (US)

( * ) Notice: Subject to any disclaimer, the term of this patent is extended or adjusted under 35 U.S.C. 154(b) by 0 days.

(21) Appl. No.: 10/823,038

(22) Filed: Apr. 12, 2004

(65) Prior Publication Data

US 2004/0261860 A1 Dec. 30, 2004

Related U.S. Application Data

(60) Provisional application No. 60/482,307, filed on Jun. 24, 2003.

(51) Int. Cl.[7] .................................................. G05D 7/01
(52) U.S. Cl. ...................................... 137/501; 137/508
(58) Field of Search ............................. 137/501 I, 502, 137/503, 504, 508

(56) References Cited

U.S. PATENT DOCUMENTS

| 988,495 | A | * | 4/1911 | Noyes ........................ 137/503 |
| 2,693,701 | A | | 11/1954 | Whitworth et al. |
| 2,751,935 | A | | 6/1956 | Smith |
| 3,079,953 | A | | 3/1963 | Mounteer |
| 3,344,805 | A | * | 10/1967 | Wapner ...................... 137/486 |
| 3,434,395 | A | | 3/1969 | Londal |
| 3,575,088 | A | | 4/1971 | Bauer |
| 3,613,517 | A | | 10/1971 | Bradley |
| 3,853,143 | A | | 12/1974 | De Lepeleire |
| 3,969,991 | A | | 7/1976 | Comstock |
| 3,999,528 | A | | 12/1976 | Knapp et al. |
| 4,015,626 | A | | 4/1977 | Thordarson |
| 4,098,285 | A | | 7/1978 | Karing |
| 4,161,961 | A | | 7/1979 | Knapp et al. |

(Continued)

FOREIGN PATENT DOCUMENTS

| DE | 3 919 299 | 1/1990 |
| FR | 2 353 093 | 12/1977 |
| JP | 404290678 | 10/1992 |
| WO | WO 01/13017 | 2/2001 |
| WO | WO 05/005841 | 1/2005 |

Primary Examiner—Stephen M. Hepperle
(74) Attorney, Agent, or Firm—Perkins Coie LLP

(57) ABSTRACT

In one embodiment, a flow control valve includes a valve body having an inlet, an outlet, a flow passageway coupling the inlet to the outlet, and a cavity with first and second chambers. The valve further includes a hollow piston disposed in the first chamber and a seal separating the first and second chambers. The seal has a section within the piston that is exposed to the fluid in the first chamber. The section of the seal defines a first effective area. The valve also includes a biasing member configured to urge the piston, and a reference pressure passageway in fluid communication with the inlet and the second chamber. The valve can further include a piston seat that has a second inner effective area at least approximately equal to the first inner effective area.

50 Claims, 6 Drawing Sheets

U.S. PATENT DOCUMENTS

| | | | |
|---|---|---|---|
| 4,177,830 A | 12/1979 | Munson | |
| 4,210,171 A | 7/1980 | Rikuta | |
| 4,228,777 A | 10/1980 | Haase | |
| 4,241,757 A | 12/1980 | Bron | |
| 4,250,914 A | 2/1981 | Ferrentino | |
| 4,250,915 A | 2/1981 | Rikuta | |
| 4,254,791 A | 3/1981 | Bron | |
| 4,278,010 A | 7/1981 | Wallischeck et al. | |
| 4,343,305 A | 8/1982 | Bron | |
| 4,428,397 A | 1/1984 | Bron | |
| 4,508,140 A | 4/1985 | Harrison | |
| 4,513,777 A | 4/1985 | Wright | |
| 4,541,454 A | 9/1985 | Sturman et al. | |
| 4,809,589 A | 3/1989 | Bertrand | |
| 4,809,746 A * | 3/1989 | Wolfges | 137/501 |
| 4,987,740 A | 1/1991 | Coleman | |
| 5,061,454 A | 10/1991 | Birk | |
| 5,101,854 A | 4/1992 | Bron | |
| 5,143,116 A * | 9/1992 | Skoglund | 137/487 |
| 5,214,939 A | 6/1993 | Drucker et al. | |
| 5,234,025 A | 8/1993 | Skoglund | |
| 5,251,655 A | 10/1993 | Low | |
| 5,255,711 A | 10/1993 | Reeds | |
| 5,363,876 A | 11/1994 | Nash | |
| 5,421,363 A | 6/1995 | Bron | |
| 5,450,873 A | 9/1995 | Palmer | |
| 5,495,869 A | 3/1996 | Hashida | |
| 5,638,861 A | 6/1997 | Hashida | |
| 5,642,752 A | 7/1997 | Yokota | |
| 5,662,142 A | 9/1997 | Ansite | |
| 5,673,607 A | 10/1997 | Schwab | |
| 5,727,529 A | 3/1998 | Tuckey | |
| 5,806,557 A | 9/1998 | Helge | |
| 5,853,022 A | 12/1998 | Eggleston et al. | |
| 5,878,766 A | 3/1999 | Dekhtyar | |
| 5,904,177 A | 5/1999 | Mullin et al. | |
| 5,971,012 A | 10/1999 | Skoglund | |
| 5,979,495 A | 11/1999 | Taube et al. | |
| 5,988,211 A | 11/1999 | Cornell | |
| 5,996,615 A | 12/1999 | Zuegner et al. | |
| 6,026,849 A | 2/2000 | Thordarson | |
| 6,026,850 A | 2/2000 | Newton et al. | |
| 6,062,257 A | 5/2000 | Wild et al. | |
| 6,062,534 A | 5/2000 | Eggleston | |
| 6,110,427 A | 8/2000 | Uffenheimer | |
| 6,135,142 A | 10/2000 | Yokota et al. | |
| 6,167,906 B1 | 1/2001 | Liberfarb | |
| 6,209,578 B1 | 4/2001 | Newton | |
| 6,254,576 B1 | 7/2001 | Shekalim | |
| 2002/0100506 A1 | 8/2002 | May | |

* cited by examiner

FLOW CONTROL VALVES

CROSS-REFERENCE TO RELATED APPLICATION

This application claims the benefit of provisional U.S. Patent Application No. 60/482,307, filed Jun. 24, 2003, which is hereby incorporated by reference in its entirety.

TECHNICAL FIELD

The present invention relates to constant flow control valves. More particularly, the invention is directed toward valves that include a piston working in conjunction with an upstream or downstream restriction to maintain a substantially constant flow despite changes in the pressure drop across the valve.

SUMMARY

One aspect of the invention is directed to a flow control valve for providing a substantially constant flow of fluid through the valve. In one embodiment, the valve includes a valve body having an inlet, an outlet, a flow passageway coupling the inlet to the outlet, and a cavity intersecting the flow passageway. The valve further includes a hollow piston movably disposed in the cavity adjacent to the flow passageway. A seal is positioned proximate to the piston and separates the cavity into first and second chambers. The seal has a section within the piston exposed to the fluid in the first chamber. The section of the seal defines a first effective inner area. The valve also includes a biasing member configured to urge the hollow piston in a first direction and a reference pressure passageway in fluid communication with the inlet and the second chamber. The valve further includes a member positioned at least proximate to the piston through which the flow passageway passes. The member has a second inner effective area at least approximately equal to the first inner effective area defined by the section of the seal.

In one aspect of this embodiment, the valve is configured so that changes in the pressure drop across the valve do not generally affect the flow rate of the fluid passing through the valve. In another aspect of this embodiment, the valve further includes an adjustable throttling member positioned in the flow passageway downstream of the reference pressure passageway and upstream of the first chamber. The throttling member can be movable to vary the flow rate of the fluid passing through the valve. In another aspect of this embodiment, the seal can be a diaphragm seal having central and perimeter portions coupled to the valve body and an annular portion between the central and perimeter portions. The annular portion can be positioned to contact a head of the hollow piston. The diaphragm seal can also include a first convolution radially outside the head and a second convolution radially inside the head. Alternatively, the valve can include a first seal between the valve body and the head radially outside of the hollow piston and a second seal between the valve body and the head radially inside of the piston.

In another embodiment, a valve includes a valve body having an inlet, an outlet, a flow passageway coupling the inlet to the outlet, and a cavity intersecting the flow passageway. The cavity includes a first chamber and a second chamber, and the second chamber has a generally hollow configuration. The valve further includes a piston assembly having a hollow piston body, a support member coupled to the hollow piston body, and a poppet coupled to the support member. The hollow piston body is disposed in the second chamber, and the support member and the poppet are disposed in the first chamber. The valve also includes a seal having a section separating the first and second chambers. The section of the seal has a first effective inner area. The valve further includes a biasing member configured to urge the hollow piston body toward the first chamber in a first direction and a reference pressure passageway in fluid communication with the outlet and the second chamber. The fluid in the first chamber is configured to exert a force against the section of the seal in a second direction opposite the first direction. The valve further includes a piston seat positioned to selectively engage the poppet. The piston seat encloses a second effective inner area at least approximately equal to the first effective inner area of the section of the seal.

DETAILED DESCRIPTION

The present invention is directed toward flow control valves. In the following description, numerous specific details are provided, such as particular valve configurations, to provide a thorough understanding of and an enabling description for embodiments of the invention. Those of ordinary skill in the art, however, will recognize that the invention can be practiced without one or more of the specific details explained in the following description. In other instances, well-known structures or operations are not shown or described in detail to avoid obscuring aspects of the invention.

Figure 1:
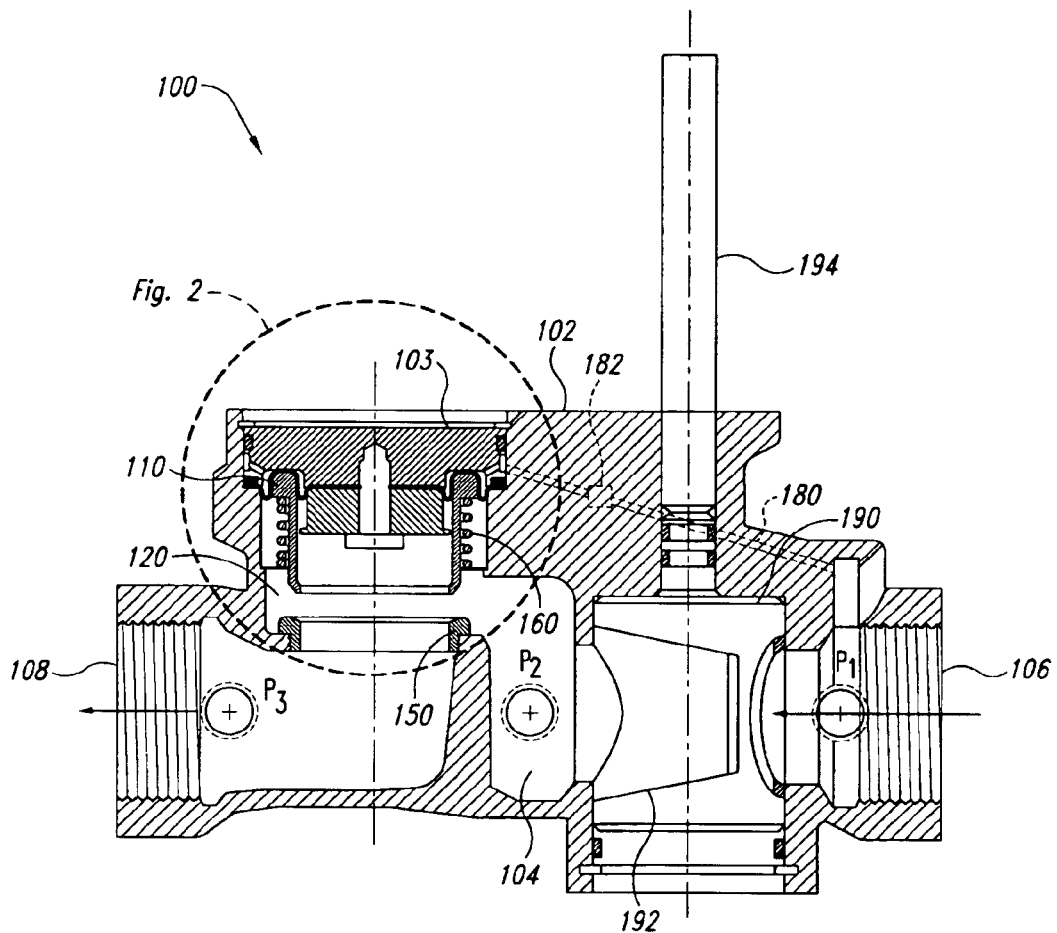
FIG. 1 is a schematic side cross-sectional view of a valve in accordance with one embodiment of the invention.

FIG. 1 is a schematic side cross-sectional view of a valve 100 for controlling the flow of a fluid in accordance with one embodiment of the invention. The valve 100 includes a valve body 102 having an inlet 106, an outlet 108, a flow passageway 104 coupling the inlet 106 to the outlet 108, and a cavity 120 intersecting the flow passageway 104. The valve 100 further includes a hollow piston 110 movably disposed within the cavity 120 and a piston seat 150 axially aligned with the hollow piston 110. The hollow piston 110 is movable within the cavity 120 relative to the piston seat 150 to define an adjustable space between the piston 110 and the piston seat 150 through which fluid can flow as the fluid moves along the flow passageway 104. The movement of the hollow piston 110 relative to the piston seat 150 is configured to maintain a constant fluid flow rate through the valve 100 despite changes in the pressure drop across the valve 100, as described below in detail.

Figure 2:
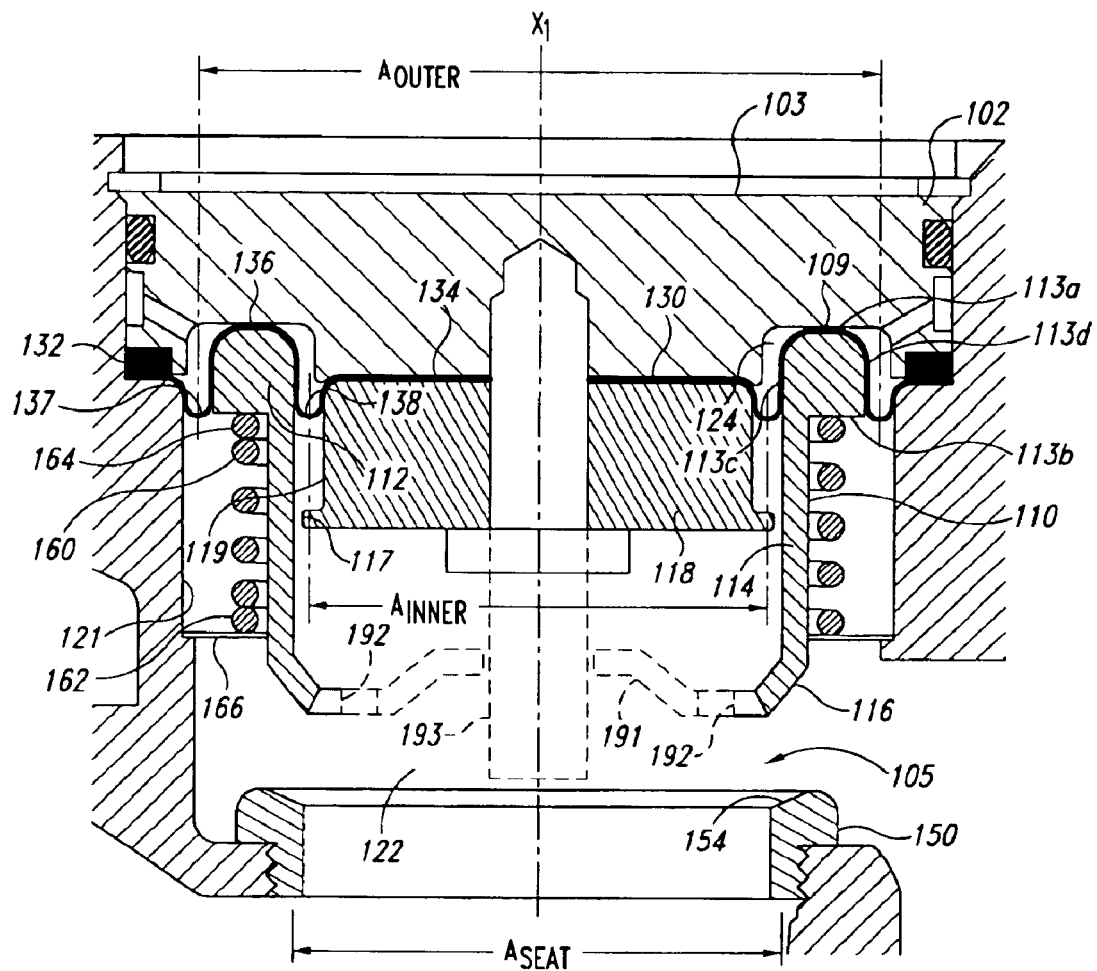
FIG. 2 is an enlarged schematic side cross-sectional view of a portion of the valve of FIG. 1.

FIG. 2 is an enlarged schematic side cross-sectional view of a portion of the valve 100 of FIG. 1. Referring to both FIGS. 1 and 2, in the illustrated embodiment, the hollow piston 110 has a generally annular configuration and includes a head 112 and a sleeve 114 projecting from the head 112. In other embodiments, the piston 110 can have other nonannular configurations, such as a rectangular, hexagonal, or octagonal shape. The head 112 can have a top surface 113a, a bottom surface 113b opposite the top surface 113a, an inner surface 113c, and an outer surface 113d. The sleeve 114 projects from the bottom surface 113b and includes an end portion 116 angled radially inward to form a tapered portion that can contact a surface 154 of the piston seat 150 when the valve 100 is closed. When the valve 100 is open and fluid is flowing through the flow passageway 104, an opening 105 is formed between the end portion 116 of the hollow piston 110 and the piston seat 150. As the hollow piston 110 moves within the cavity 120 along an axis $X_1$, the size of the opening 105 can change or the opening 105 can be closed.

When fluid is flowing through the valve 100, the pressure of the fluid at the inlet 106 is $P_1$, and the pressure at the outlet 108 is $P_3$. As the fluid moves through the valve body 102 along the flow passageway 104 and between the inlet 106 and outlet 108, the pressure of the fluid in the flow passageway is $P_2$. The portion of the cavity 120 within the hollow piston 110 is in fluid communication with the outlet 108. Accordingly, the pressure of the fluid inside the hollow piston 110 is approximately the same as the outlet pressure, namely $P_3$.

The valve 100 further includes a biasing member 160 that exerts a force against the hollow piston 110 in a direction parallel to the axis $X_1$. In the illustrated embodiment, the biasing member 160 is a coiled spring positioned around the piston 110 and has a first end 162 and a second end 164 opposite the first end 162. The first end 162 can be carried by a support member 166 and the second end 164 can engage the bottom surface 113b of the head 112 to urge the piston 110 away from the piston seat 150. The support member 166 can include a plurality of apertures (not shown) so that the portion of the cavity 120 outside of the piston 110 is in fluid communication with the flow passageway 104. Accordingly, the pressure outside the hollow piston 110 is approximately the same as the flow passageway pressure $P_2$. In additional embodiments, the biasing member 160 and the piston 110 can be arranged differently while still biasing the hollow piston 110 away from the piston seat 150. For example, the biasing member 160 can be positioned on the opposite side of the head 112 of the piston 110 to engage the top surface 113a of the head 112.

In the illustrated embodiment, the valve body 102 further includes a removable cover 103 and a piston guide 118 coupled to the cover 103. The cover 103 can be removed from the valve 100 to assemble and/or service the piston 110, the biasing member 160, or any other components in the cavity 120. In one aspect of this embodiment, the cover 103 includes an annular channel 109 to selectively receive at least a portion of the head 112 of the piston 110. The piston guide 118 projects from the cover 103 and can be received in the hollow piston 110 to guide the piston 110 as it moves along the axis $X_1$. The piston guide 118 can include an outer wall 119 and a rim 117 projecting from the outer wall 119 to prevent the piston 110 from moving transverse to the axis $X_1$.

In another embodiment, transverse movement of the piston 110 relative to axis $X_1$ is prevented by an elongated guide post 193 (shown in broken lines in FIG. 2) securely attached to the valve body 102. The piston 110 can include a cap 191 (shown in broken lines in FIG. 2) extending radially inward from the sleeve 114 and the post 193 slideably extends through a central aperture in the cap 191.

The cap 191 can include a plurality of apertures 192 so that fluid can flow freely through the cap 191 to and from the portion of the cavity 120 within the piston 110. Accordingly, when the piston 110 moves axially, the cap 191 slides axially along the post with virtually no piston movement transverse to the axis $X_1$.

In the illustrated embodiment, the valve 100 also includes a seal 130 that divides the cavity 120 into a first chamber 122 and a second chamber 124. The seal 130 can be a diaphragm seal with a perimeter portion 132 anchored to the cover 103, a central portion 134 attached between the cover 103 and the piston guide 118, and an annular portion 136 extending between the perimeter and central portions 132 and 134. The seal's annular portion 136 separates the fluid in the first chamber 122 from the fluid in the second chamber 124. The annular portion 136 can be made of a flexible material, such as rubber, fabric coated rubber, Mylar®, metal foil, or another suitable material so that the pressure in the second chamber 124 can force the annular portion 136 against the head 112 of the piston 110. Consequently, the annular portion 136 can remain in contact with the head 112 as the piston 110 moves along the axis $X_1$.

In one aspect of this embodiment, the annular portion 136 of the seal 130 is configured to drape over the head 112 of the piston 110 to allow for the axial movement of the piston 110. The annular portion 136 can include a first convolution 137 position along the outside of the piston's head 112 and a second convolution 138 positioned along the inside of the head 112. The first and second convolutions 137 and 138 are sized to allow the piston to move axially along its entire stroke, while providing a fairly minimal spring-like resistance to the annular portion 136 of the seal 130.

As indicated above, the inside of the hollow piston is exposed to the fluid pressure $P_3$. Accordingly, the second convolution 138 of the seal's annular portion 136 is also exposed to a force from $P_3$ in one direction. The lower end portion 116 of the hollow piston 110 is tapered so as to provide a surface within the hollow piston 110 that is also exposed to an equal but opposite force from $P_3$ in the direction away from the second convolution 138. Accordingly, the tapered lower end portion 116 of the hollow piston 110 simplifies the force balance within the valve 100, as discussed in greater detail below. In other embodiments, the valve 100 may include two seals or other types of seals. For example, in one embodiment, the valve can include a first O-ring to seal the gap between the head 112 and the valve body 102 outside of the piston 110 and a second O-ring to seal the gap between the head and the valve body inside of the piston.

The desired constant fluid flow rate through the valve 100 is controlled by a flow throttle 190 positioned in the flow passageway 104. The flow throttle 190 includes an opening 192 to selectively permit fluid to flow from the inlet 106 to the cavity 120. The flow throttle 190 is coupled to a rotatable stem 194 so that the flow throttle 190 and stem 194 can rotate as a unit to move the opening 192 relative to the flow passageway 104, such that the fluid flow therethrough is varied.

The valve body 102 further includes a reference pressure passageway 180 in fluid communication with the inlet 106 and the second chamber 124. The pressure in the second chamber 124 is therefore approximately the same as the inlet pressure $P_1$. The inlet pressure $P_1$ consequently determines the force the fluid in the second chamber 124 exerts against the annular portion 136 of the seal 130 between an outer wall 121 of the cavity 120 and the outer wall 119 of the piston guide 118. The pressure $P_2$ in the flow passageway 104 determines the force that the fluid outside of the hollow piston 110 exerts on the first convolution 137 of the seal 130 and the hollow piston 110. The outlet pressure $P_3$ determines the forces that the fluid inside the piston seat 150 and the fluid inside the hollow piston 110 exert on the second convolution 138 of the seal 130 and on the hollow piston 110.

During operation of the valve 100 in a fluid system, the outlet pressure $P_3$ can fluctuate as a result of other forces acting on the fluid system. The control valve 100, however, is configured so that changes in the pressure drop across the valve 100 do not change the flow rate, thereby providing a constant fluid flow through the valve 100. This constant flow configuration that is independent of the outlet pressure $P_3$ is demonstrated by the following force balance equation:

$$P_1(A_{outer}-A_{inner})=P_2(A_{outer}-A_{seat})+K_{spring}*X_{spring}+K_{seal}*X_{seal}+P_3(A_{seat}-A_{inner})$$

where $A_{outer}$=area enclosed by the midpoint of the first convolution 137 of the seal 130

$A_{inner}$=area enclosed by the midpoint of the second convolution 138 of the seal 130

$A_{seat}$=effective area enclosed by the piston seat 150

$K_{spring}$=spring constant of the biasing member 160

$X_{spring}$=deflection of the biasing member 160

$K_{seal}$=spring constant of the seal 130

$X_{seal}$=movement of the seal 130

The effective area $A_{seat}$ is defined by the position at which the pressure in the fluid flow changes from $P_2$ to $P_3$ between the end portion 116 of the piston 110 and the piston seat 150. The position at which the fluid pressure changes from $P_2$ to $P_3$ can vary radially across the fluid flow between the end portion 116 and the piston seat 150. For example, the position at which the fluid pressure changes from $P_2$ to $P_3$ at a midpoint between the end portion 116 and the piston seat 150 is generally radially inward from the position at which the pressure changes from $P_2$ to $P_3$ proximate to the end portion 116. Moreover, the effective area $A_{seat}$ enclosed by the piston seat 150 can change slightly as fluid flows between the end portion 116 and the piston seat 150 because the fluid flow rate, the position of the piston 110 relative to the piston seat 150, and other factors can influence the effective area $A_{seat}$. If, however, the difference between $A_{outer}$ and $A_{inner}$ is large, the changes in the effective area $A_{seat}$ are less significant. Accordingly, embodiments of the valve can have the seal 130 with the annular area several times larger than the piston seat area. Moreover, if the piston seat 150 encloses a large area and the travel of the piston 110 is reduced, the changes in the effective area $A_{seat}$ are less significant. In one embodiment, the seal 130 is selected with a spring constant $K_{seal}$ significantly smaller than the spring constant $K_{spring}$ of the biasing member 160 so that the force represented by $K_{seal}*X_{seal}$ is insignificant in the above-mentioned force balance equation.

In other embodiments, $A_{outer}$ and $A_{inner}$ can change as the piston 110 moves along the axis $X_1$. For example, in one embodiment, the piston guide 118 can be tapered so that the diameter of the piston guide 118 proximate to the cover 103 is greater than the diameter of the guide 118 proximate to the rim 117. In this embodiment, the midpoint of the second convolution 138 of the seal 130 moves laterally in a direction perpendicular to the axis $X_1$, and therefore changes $A_{inner}$, as the piston 110 moves along the axis $X_1$. Similarly, in an additional embodiment, the diameter of the cavity 120 can change between the cover 103 and the support member 166. In this embodiment, the midpoint of the first convolution 137 of the seal 130 moves laterally in a direction perpendicular to the axis $X_1$, and therefore changes $A_{outer}$, as the piston 110 moves along the axis $X_1$. In additional embodiments, the sleeve 114 and/or the head 112 of the piston 110 can be tapered.

In one aspect of the illustrated embodiment, the area $A_{inner}$ enclosed by the midpoint of the second convolution 138 of the seal 130 is substantially equal to the effective area $A_{seat}$ enclosed by the piston seat 150. If $A_{inner}=A_{seat}$, then the effect of $P_3$ is negated, and the force balance equation can be simplified to:

$$P_1(A_{outer}-A_{inner})=P_2(A_{outer}-A_{inner})+K_{spring}*X_{spring}+K_{seal}*X_{seal}$$

The above equation can be rewritten as follows:

$$(P_1-P_2)=(K_{spring}*X_{spring}+K_{seal}*X_{seal})/(A_{outer}-A_{inner})$$

The biasing member 160 and the seal 130 can be selected with suitable spring constants K so that a change in $P_1-P_2$ causes a corresponding deflection X in the biasing member and the seal that results in a constant fluid flow. Accordingly, $P_1-P_2$ controls the fluid flow rate across the flow throttle 190, the biasing member 160 acts to maintain the constant flow rate through the valve 100, and the effect of the outlet pressure $P_3$ on the flow rate is substantially eliminated. Thus, the valve 100 can maintain a constant fluid flow rate in both high pressure, low volume environments and low pressure, high volume environments despite changes in the pressure drop across the valve 100. The illustrated valve 100 is advantageous for applications in which there is a need for a constant fluid flow rate in an environment with a dynamic outlet pressure. Prior art valves have not been able to successfully eliminate the effect of the outlet pressure on fluid flow rate in many fluid flow configurations or environments. The illustrated valve 100 is also advantageous for applications that have a high line pressure because the outlet pressure $P_3$ acts along the axis $X_1$ against a small area of the piston 110. Accordingly, the piston 110 is not subjected to high compressive loads.

In additional embodiments, the valve 100 may further include a restriction 182 (shown schematically in hidden lines in FIG. 1) in the reference pressure passageway 180 to limit the flow rate of fluid flowing into or out of the second chamber 124. Limiting the flow rate into and out of the second chamber 124 slows the response of the piston 110 to changes in pressure. In certain applications, it may be advantageous to slow the movement of the piston 110 in response to a change in pressure. For example, when the valve 100 experiences a large increase in pressure at the inlet 106, the fluid in the second chamber 124 exerts a correspondingly large force on the piston 110, which may cause the piston 110 to overshoot the equilibrium position and hit the piston seat 150. Consequently, the piston 110 oscillates back-and-forth within the cavity 120 as the biasing member 160 exerts a force on the piston 110 to urge the piston 110 back toward the equilibrium position. The oscillation of the piston 110 may cause fluid oscillations and water hammer effects, in which the fluid flow rate through the valve 110 changes rapidly. The restriction 182 in the reference pressure passageway 180 can accordingly reduce fluid oscillations and water hammer effects in the valve 100.

Figure 3:
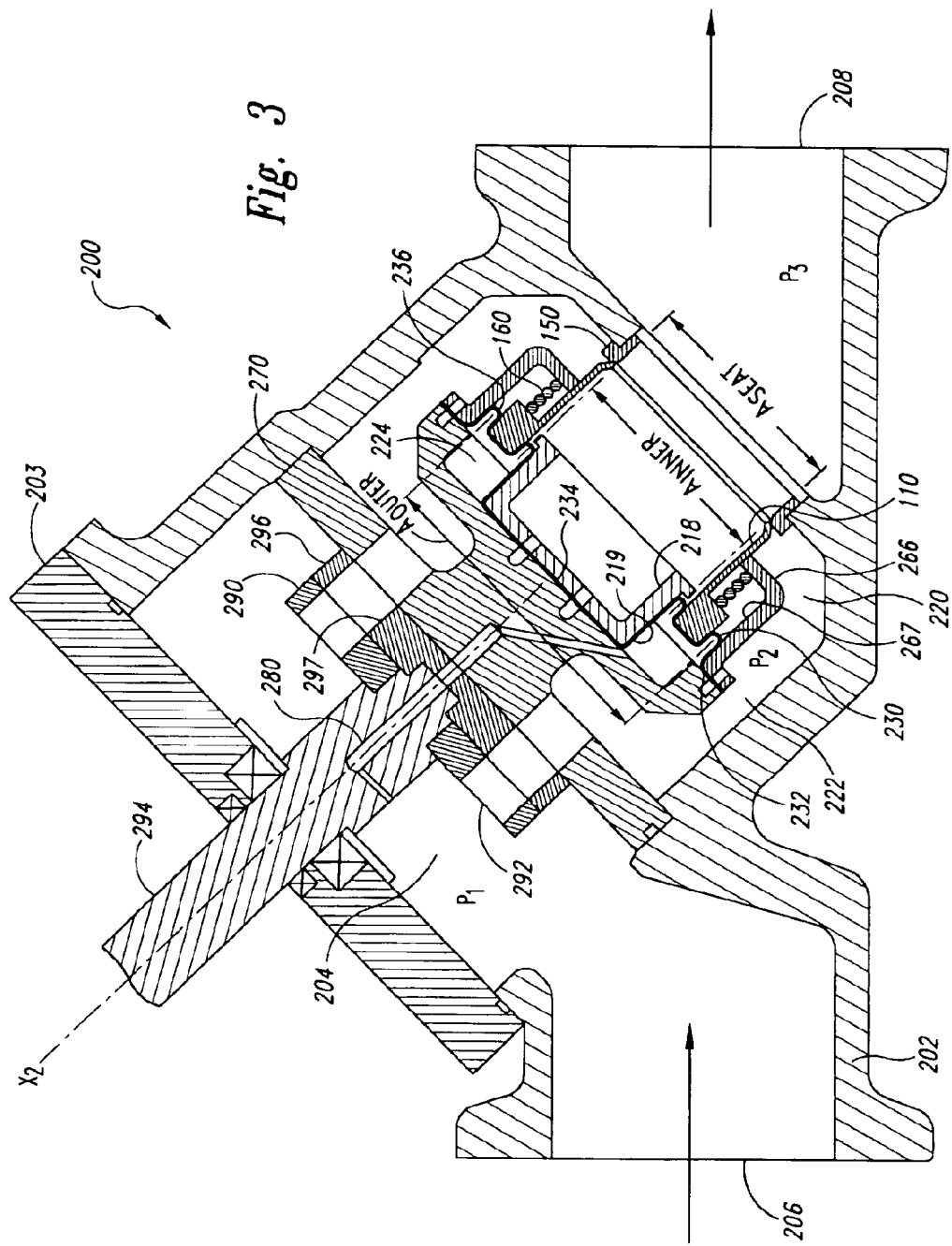
FIG. 3 is a schematic side cross-sectional view of a valve in accordance with another embodiment of the invention.

FIG. 3 is a schematic side cross-sectional view of a valve 200 for controlling the flow of a fluid in accordance with another embodiment of the invention. The valve 200 operates in a similar manner and has similar internal components as the valve 100 described above with reference to FIGS.

1–2. The valve 200, however, has internal components that are substantially axially aligned and removable as a single unit from the valve body for easy replacement, maintenance, or repair. The valve 200 of the illustrated embodiment includes a valve body 202 having an inlet 206, an outlet 208, a flow passageway 204 coupling the inlet 206 to the outlet 208, and a cavity 220 intersecting the flow passageway 204. A piston seat 150 is connected to the valve body 202 within the flow passageway 204 at a selected distance upstream from the outlet 208. The internal components of the valve 200 include a hollow piston 110 axially aligned with the piston seat 150 and movably disposed within the cavity 220. A biasing member 160 engages the piston 110 and urges the piston 110 away from the piston seat 150. A seal 230 is positioned to separate the cavity 220 into a first chamber 222 and a second chamber 224. The seal 230 includes a perimeter portion 232, a central portion 234, and an annular portion 236 extending between the perimeter and central portions 232 and 234. The portion of the cavity 220 enclosed by the piston 110 is in fluid communication with the outlet 208, and accordingly, the pressure inside the piston 110 is approximately equal to the outlet pressure $P_3$.

A removable cover 203 is attached to the valve body 202 to cover an opening to the cavity 220 and enclose the valve's internal components within the valve body 202. Accordingly, the valve's internal components can be easily and quickly accessed or removed from the valve body 202 upon removing the valve cover 203. The valve body 202 further contains a first support member 270, a second support member 266 configured to carry the biasing member 160, and a piston guide 218 configured to guide the piston 110 along an axis $X_2$. In the illustrated embodiment, the perimeter portion 232 of the seal 230 is anchored between the first and second support members 270 and 266, and the central portion 234 of the seal 230 is sandwiched between the piston guide 218 and the first support member 270. Accordingly, the support members 266 and 270, the piston guide 218, and the annular portion 236 of the seal 230 define the second chamber 224.

The valve 200 further includes a fixed plate 296 attached to the first support member 270 and a flow throttle 290 positioned proximate to the fixed plate 296 to control the desired fluid flow rate through the flow passageway 204. The fixed plate 296 and the first support member 270 include a plurality of apertures 297 arranged sequentially in a generally circular configuration. The flow throttle 290 also includes a plurality of apertures 292 arranged sequentially in a generally circular configuration. A stem 294 rotates the flow throttle 290 to align the apertures 292 with corresponding apertures 297 in the fixed plate 296 and the first support member 270 to permit fluid to flow from the flow passageway 204 to the cavity 220. The degree to which the apertures 292 and 297 are aligned controls the rate of fluid flow through the valve 200. The flow throttle 290 can create a pressure differential such that the pressure $P_2$ in the cavity 220 outside the hollow piston 110 is different than the inlet pressure $P_1$. In other embodiments, the flow throttle can have other configurations to control the fluid flow through the valve.

The valve 200 also includes a reference pressure passageway 280 that extends through the stem 294 and the first support member 270. The reference pressure passageway 280 is in fluid communication with the second chamber 224 and the flow passageway 204. The pressure in the second chamber 224 is therefore approximately equal to the inlet pressure $P_1$. The inlet pressure $P_1$ consequently determines the force that the fluid in the second chamber 224 exerts against the annular portion 236 of the seal 230.

The valve 200 in this alternate embodiment also operates based on the following force balance equation:

$$P_1(A_{outer}-A_{inner})=P_2(A_{outer}-A_{seal})+K_{spring}*X_{spring}+K_{seal}*X_{seal}+P_3(A_{seat}-A_{inner})$$

where $A_{outer}$=area enclosed by the midpoint of the first convolution of the seal 230

$A_{inner}$=area enclosed by the midpoint of the second convolution of the seal 230

$A_{seat}$=effective area enclosed by the piston seat 150

$K_{spring}$=spring constant of the biasing member 160

$X_{spring}$=deflection of the biasing member 160

$K_{seal}$=spring constant of the seal 230

$X_{seal}$=movement of the seal 230

In one aspect of the illustrated embodiment, the area $A_{inner}$ enclosed by the midpoint of the second convolution of the seal 230 is equal to the area $A_{seat}$ enclosed by the piston seat 150. If $A_{inner}=A_{seat}$, then the effect of $P_3$ is negated, and the force balance equation can be simplified to:

$$P_1(A_{outer}-A_{inner})=P_2(A_{outer}-A_{inner})+K_{spring}*X_{spring}+K_{seal}*X_{seal}$$

This force balance equation can be rewritten as follows:

$$(P_1-P_2)=(K_{spring}*X_{spring}+K_{seal}*X_{seal})/(A_{outer}-A_{inner})$$

Accordingly, the pressure drop between $P_1$ and $P_2$ controls the fluid flow rate, and the biasing member 160 acts to maintain the constant flow through the valve 200, as discussed above. Therefore, the effect of fluctuations in the pressure drop across the valve 200 on the fluid flow rate is substantially eliminated.

Figure 4:
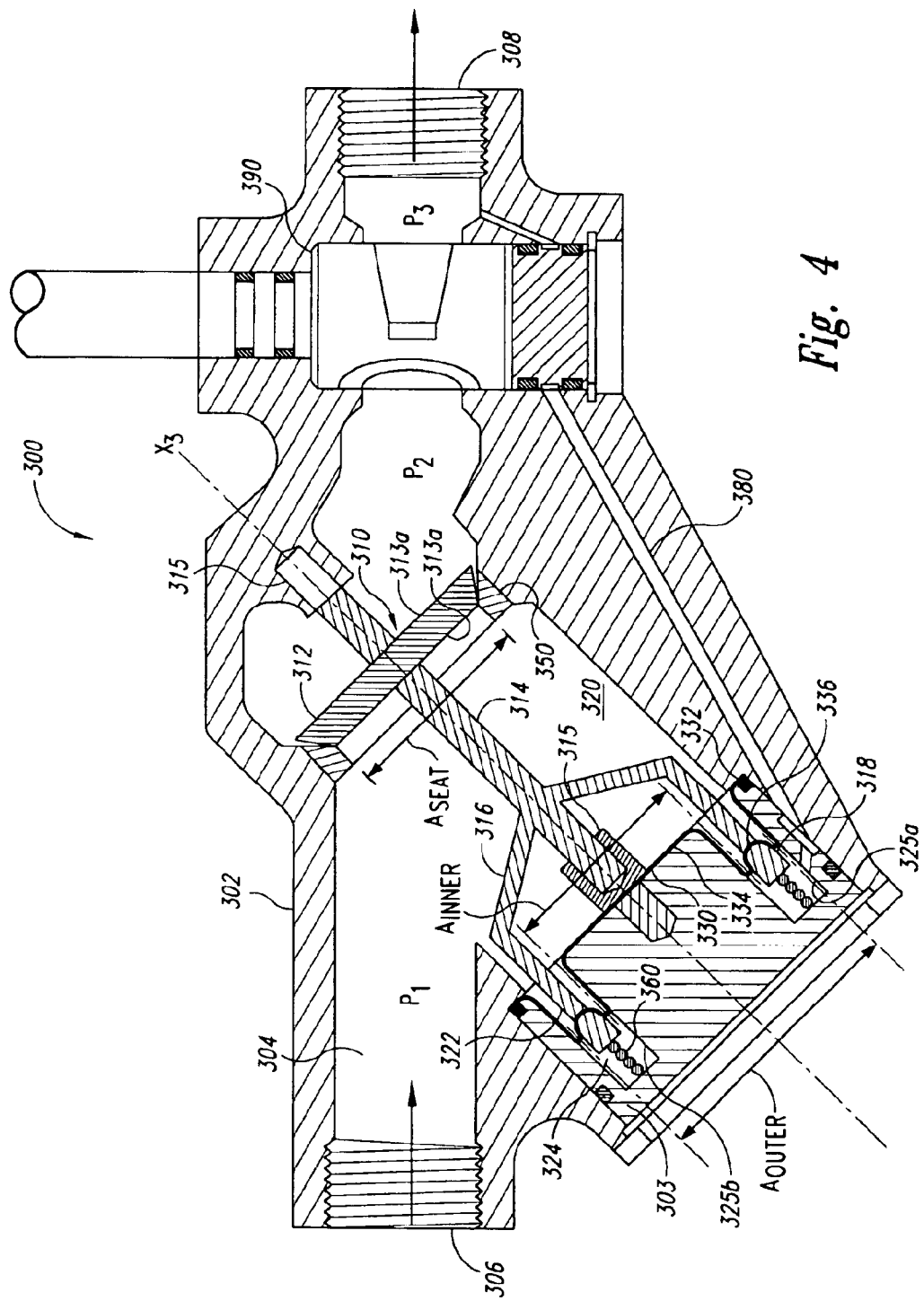
FIG. 4 is a schematic side cross-sectional view of a valve in accordance with another embodiment of the invention.

FIG. 4 is a schematic side cross-sectional view of a valve 300 for controlling the flow of a fluid in accordance with another embodiment of the invention. The valve 300 operates in a similar manner to the valves 100 and 200 described above with reference to FIGS. 1–3 to provide a constant flow rate independent of changes in the pressure drop across the valve 300. In this illustrated alternate embodiment, the valve 300 includes a valve body 302 having an inlet 306, an outlet 308, a flow passageway 304 coupling the inlet 306 to the outlet 308, and a cavity 320 intersecting the flow passageway 304. The valve 300 further includes a piston assembly 310 having a poppet 312, a shaft 314 coupled to the poppet 312, a plurality of branches 316 coupled to the shaft 314, and a hollow piston body 318 coupled to the branches 316. The piston assembly 310 is movable as a unit along an axis $X_3$ to maintain a constant flow of fluid through the valve 300. The valve body 302 has a seat 350 positioned adjacent to the poppet 312 such that the poppet 312 can move axially relative to the seat 350. More specifically, the poppet 312 can selectively move axially away from the seat 350 to permit fluid to flow through the flow passageway 304, as described in detail below. When the valve 300 is closed, the poppet 312 sealably engages the seat 350 and prevents fluid flow through the valve 300. The valve body 302 includes a plurality of piston guides 315 to guide the shaft 314 and prevent the piston assembly 310 from moving transverse to the axis $X_3$. The branches 316 can be discrete members spaced apart from each other around the axis $X_3$ to allow fluid to flow between them.

The valve 300 further includes a biasing member 360 and a seal 330 dividing the cavity 320 into a first chamber 322 and a second chamber 324. The biasing member 360 and the hollow piston body 318 are disposed in the second chamber 324 with the biasing member 360 positioned to urge the hollow piston body 318 toward the first chamber 322. The seal 330 includes perimeter and central portions 332 and 334 coupled to the valve body 302 and an annular portion 336 between the perimeter and central portions 332 and 334. The annular portion 336 can be disposed between the branches 316 and the hollow piston body 318. Alternatively, the branches 316 can be attached to the hollow piston body 318 and the annular portion 336 can include apertures to receive the corresponding branches 316. The annular portion 336 separates the fluid in the first chamber 322 from the fluid in the second chamber 324. The valve body 302 further includes a removable cover 303 that defines part of the second chamber 324.

The valve 300 further includes a flow throttle 390 and a reference pressure passageway 380 in fluid communication with the outlet 308 and the second chamber 324. The pressure in the second chamber 324 is therefore approximately equal to the outlet pressure $P_3$. The outlet pressure $P_3$ consequently determines the force that the fluid in the second chamber 324 exerts against the annular portion 336 of the seal 330 and the hollow piston body 318 between an outer wall 325a and an inner wall 325b of the second chamber 324. The inlet pressure $P_1$ in the first chamber 322 determines the force the fluid exerts on the annular portion 336 of the seal 330 and a first side 313a of the poppet 312. The pressure $P_2$ in the flow passageway 304 between the poppet 312 and the flow throttle 390 determines the force the fluid exerts on a second side 313b of the poppet 312. Accordingly, the valve 300 operates based on the following force balance equation:

$$P_3(A_{outer}-A_{inner})+K_{spring}*X_{spring}+K_{seal}*X_{seal}=P_1(A_{outer}-A_{inner})-A_{seal}(P_3-P_2)$$

where $A_{outer}$=area enclosed by the midpoint of the portion of the seal 330 between the piston body 318 and the valve body 302

$A_{inner}$=area enclosed by the midpoint of the portion of the seal 330 between the piston body 318 and the piston guide $A_{seat}$=effective area enclosed by the piston seat 350

$K_{spring}$=spring constant of the biasing member 360

$X_{spring}$=deflection of the biasing member 360

$K_{seal}$=spring constant of the seal 330

$X_{seal}$=movement of the seal 330

One feature of the illustrated embodiment is that the area $A_{inner}$ enclosed by the midpoint of the portion of the seal 330 between the piston body 318 and the piston guide is approximately equal to the area $A_{seat}$ enclosed by the piston seat 350. In this configuration, the outlet pressure $P_3$ may not be fully eliminated. In low pressure drop configurations, however, the hollow piston body 318 provides a reduced area on which the outlet pressure $P_3$ acts, so that the effect of fluctuations in the outlet pressure $P_3$ at low pressure drops is minimal. One aspect of the configuration in this embodiment is that the area defined by $A_{outer}$ can be much larger than $A_{seat}$, which provides for consistent and reliable performance of the valve 300, particularly at lower pressure drops. Another advantage of this feature is the improved fluid dynamics of the constant flow through the cavity 320 at low pressure drops.

Figure 5:
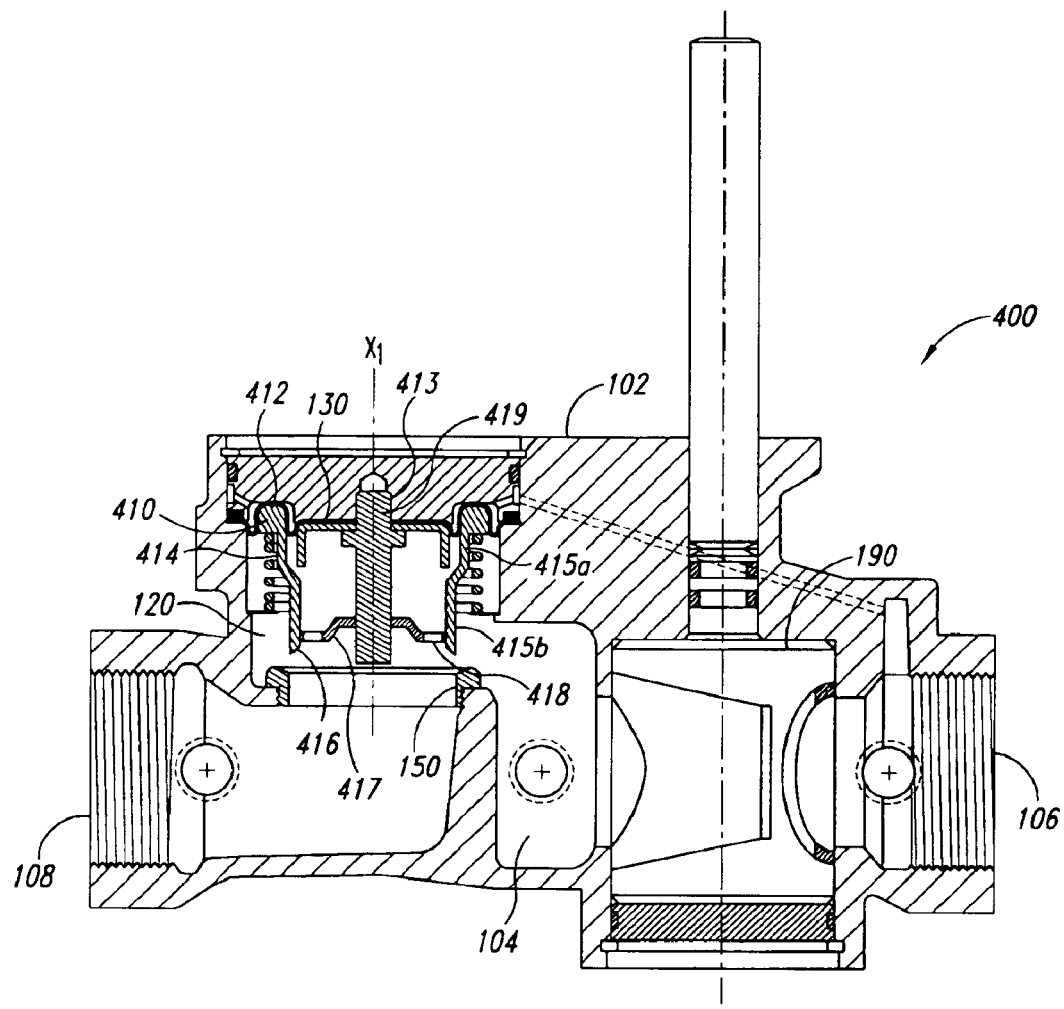
FIG. 5 is a schematic side cross-sectional view of a valve for controlling the flow of a fluid in accordance with another embodiment of the invention.

FIG. 5 is a schematic side cross-sectional view of a valve 400 for controlling the flow of a fluid in accordance with another embodiment of the invention. The valve 400 is generally similar to the valve 100 described above with reference to FIGS. 1–2. For example, the valve 400 includes a valve body 102 having an inlet 106, an outlet 108, a flow passageway 104 coupling the inlet 106 to the outlet 108, and a cavity 120 intersecting the flow passageway 104. The valve 400 further includes a hollow piston 410 movably disposed within the cavity 120 and a piston seat 150 axially aligned with the hollow piston 410. The hollow piston 410 includes a head 412, a sleeve 414 projecting from the head 412, a cap 417 extending radially inward from the sleeve 414, and a post 419 coupled to the cap 417. The sleeve 414 can have a first portion 415a with a first diameter and a second portion 415b with a second diameter less than the first diameter. The second portion 415b of the sleeve 414 can include an end portion 416 that projects beyond the cap 417 to selectively engage the piston seat 150. The end portion 416 can have a bevel tapered inwardly. The cap 417 includes a plurality of apertures 418 so that fluid can flow freely through the cap 417 to and from the portion of the cavity 120 within the hollow piston 410. The valve body 102 also has a guide 413 configured to receive the post 419 to prevent the piston 410 from moving transverse to an axis $X_1$. In other embodiments, the piston 410 can have other configurations, such as a configuration that does not include the end portion 416 projecting beyond the cap 417.

Figure 6:
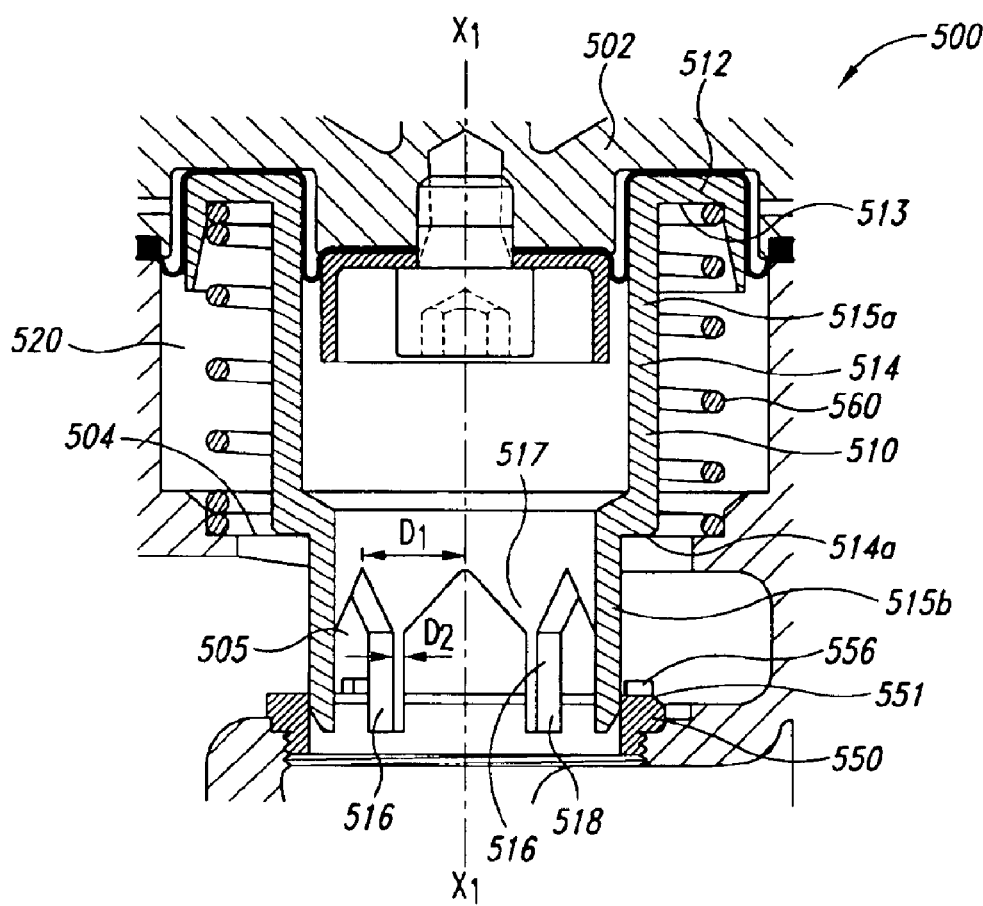
FIG. 6 is a schematic side cross-sectional view of a portion of a valve in accordance with another embodiment of the invention.

FIG. 6 is a schematic side cross-sectional view of a portion of a valve 500 in accordance with another embodiment of the invention. The valve 500 is generally similar to the valves 100 and 400 described above with reference to FIGS. 1, 2 and 5. For example, the valve 500 includes a valve body 502 with a cavity 520, a hollow piston 510 movably disposed within the cavity 520, and a piston seat 550 aligned with the piston 510. The hollow piston 510 includes a head 512 and a sleeve 514 projecting from the head 512. The sleeve 514 has a first portion 515a with a first diameter and a second portion 515b with a second diameter less than the first diameter. The length and diameter of the second portion 515b can be sized so that a section of the second portion 515b is received within the piston seat 550 throughout the stroke of the piston 510. As such, the piston seat 550 acts to guide the piston 510 and reduce movement in a direction transverse to the axis $X_1$.

The illustrated valve 500 further includes a plurality of stops 556 (two are shown in FIG. 6) to limit the range of motion of the piston 510. The stops 556 can be attached to a surface 551 of the piston seat 550 and positioned so that when the valve 500 is closed, the stops 556 contact a surface 514a at the junction of the first and second portions 515a and 515b of the sleeve 514. In addition to limiting the stroke of the piston 510, the stops 556 prevent the sleeve 514 from colliding with the piston seat 550 and damaging the valve 500. Moreover, the stops 556 can prevent the piston 510 from forming a complete seal with the piston seat 550 and jamming or binding in a closed position under certain conditions. In other embodiments, however, the valve 500 may not include stops 556.

The illustrated second portion 515b of the sleeve 514 includes a plurality of legs 516 defining openings 505 through which fluid can flow. The legs 516 and openings 505 can have various shapes and configurations. For example, the illustrated legs 516 include a tapered portion 517 and a rectangular portion 518 projecting from the tapered portion 517. The tapered portion 517 has a first dimension $D_1$, and the rectangular portion 518 has a second dimension $D_2$ less than the first dimension $D_1$. As the piston 510 moves along the axis $X_1$ and approaches the closed position, the tapered portion 517 of the legs 516 reduces the lateral size of the openings 505 through which fluid flows. Accordingly, one feature of the illustrated valve 500 is that the lateral size of the openings 505 is reduced over a final portion of the stroke of the piston 110. This feature reduces the rate at which the area of the openings 505 decreases as the valve 500 closes.

As such, the valve 500 closes less abruptly than conventional valves without this feature. Advantageously, this feature reduces fluid flow oscillations and water hammer effects that are caused by a sudden change in the size of the openings 505.

The valve 500 further includes a biasing member 560 for exerting a force against the piston 510 in a direction parallel to the axis $X_1$. The head 512 of the piston 510 can include a channel 513 for receiving one end of the biasing member 560 and a shelf 504 in the valve body 502 can support the other end of the member 560. Alternatively, the head 512 may not include a channel, and a bottom surface of the head may contact the biasing member 560, as described above with reference to FIG. 2.

From the foregoing, it will be appreciated that specific embodiments of the invention have been described herein for purposes of illustration, but that various modifications may be made without deviating from the spirit and scope of the invention. For example, many of the elements of one embodiment can be combined with the other embodiments in lieu of or in addition to the elements of the other embodiments. Accordingly, the invention is not limited except as by the appended claims.

We claim:

1. A flow control valve for providing a substantially constant flow of fluid through the valve, comprising:
   a valve body having an inlet, an outlet, a flow passageway coupling the inlet to the outlet, and a cavity intersecting the flow passageway;
   a hollow piston movably disposed in the cavity adjacent to the flow passageway;
   a seal positioned in the cavity proximate to the piston and sealably separating the cavity into first and second chambers, the seal having at least a section exposed to the fluid in the first chamber, the section of the seal having an inner perimeter portion defining a first effective inner area within the hollow piston;
   a biasing member configured to urge the hollow piston;
   a reference pressure passageway in fluid communication with the inlet and the second chamber; and
   a member positioned at least proximate to the piston and the flow passageway, the member having an orifice with a second inner effective area at least approximately equal to the first effective inner area defined by the section of the seal, the piston being movable relative to the member to vary a portion of the flow passageway.

2. The valve of claim 1 wherein the hollow piston includes a head configured to contact the seal and a sleeve projecting from the head, the sleeve having an end portion adjacent to the member.

3. The valve of claim 1 wherein the hollow piston, the seal, and the biasing member form internal components of the valve, and wherein the internal components are removable as a unit.

4. The valve of claim 1 wherein the seal is a diaphragm seal having central and perimeter portions coupled to the valve body and an annular portion between the central and perimeter portions, the annular portion being positioned to contact a portion of the hollow piston.

5. The valve of claim 1 wherein the piston includes a head, and wherein the seal is a diaphragm seal having a first convolution radially outside the head and a second convolution radially inside the head.

6. The valve of claim 1 wherein the seal is a first seal between the valve body and hollow piston radially inside of the piston, and wherein the valve further comprises a second seal between the valve body and the hollow piston radially outside of the piston.

7. The valve of claim 1 wherein the hollow piston includes a sleeve with an end portion projecting radially inward.

8. The valve of claim 1 wherein the inlet is exposed to the fluid under a first pressure and the outlet is exposed to the fluid under a second pressure, the valve body, the piston, the seal, the biasing member, and the member being sized and configured to provide a fluid flow through the flow passageway with a substantially constant flow rate independent of fluctuations in the second pressure at the outlet.

9. The valve of claim 1 wherein the biasing member is a coiled spring.

10. The valve of claim 1 wherein the biasing member is configured to urge the hollow piston in a first direction, and wherein the valve further comprises a guide post disposed at least partially in the cavity and configured to reduce movement of the piston in a second direction transverse to the first direction.

11. The valve of claim 1 wherein the hollow piston includes a head positioned to contact the seal and a sleeve projecting from the head, the sleeve having a first portion with a first diameter and a second portion with a second diameter different than the first diameter, the second portion being sized and positioned so that at least a section of the second portion is movable within the orifice of the member throughout at least a portion of a stroke of the piston.

12. The valve of claim 11 wherein the first portion of the sleeve is between the head and the second portion of the sleeve, wherein the first diameter is greater than the second diameter, and wherein the valve further comprises at least one stop attached to the member to limit the range of motion of the piston.

13. The valve of claim 11 wherein the second portion is sized and positioned so that the at least a section of the second portion is movable within the orifice of the member throughout the stroke of the piston.

14. The valve of claim 1 wherein the hollow piston includes a head positioned to contact the seal and a sleeve projecting from the head, the sleeve having a first portion with a first diameter and a second portion with a second diameter different than the first diameter, the second portion having a plurality of legs defining openings through which fluid flows.

15. The valve of claim 14 wherein the piston is movable along an axis, and wherein the individual legs have a proximal portion with a first dimension transverse to the axis and a distal portion with a second dimension transverse to the axis, the second dimension being less than the first dimension to reduce the rate at which the area of the openings decreases as the valve closes.

16. The valve of claim 1 wherein the reference pressure passageway includes a restriction to limit the fluid flow rate between the second chamber and the inlet.

17. A flow control valve for providing a substantially constant flow of fluid through the valve, comprising:
   a valve body having an inlet, an outlet, a flow passageway coupling the inlet to the outlet, and a cavity intersecting the flow passageway;
   a hollow piston movably disposed within the cavity;
   a seal separating the cavity into first and second chambers, the second chamber having a generally annular configuration with an effective inner diameter;
   a biasing member configured to urge the hollow piston toward the second chamber;
   a reference pressure passageway in fluid communication with the inlet and the second chamber; and a piston seat positioned at least proximate to the piston and the flow passageway, the piston seat having an effective inner diameter at least approximately equal to the effective inner diameter of the second chamber.

18. The valve of claim 17 wherein the seal is a diaphragm seal having center and perimeter portions coupled to the valve body and an annular portion between the center and perimeter portions positioned to contact the hollow piston.

19. The valve of claim 17 wherein the seal includes a first convolution radially outside the piston and a second convolution radially inside the piston.

20. The valve of claim 17 wherein the seal includes a first seal between the valve body and the hollow piston radially outside of the piston, and wherein the valve further comprises a second seal between the valve body and the hollow piston radially inside of the piston.

21. The valve of claim 17 wherein the hollow piston includes a head adjacent to the seal and a sleeve projecting from the head, the sleeve having an end portion adjacent to the piston seat.

22. The valve of claim 17 wherein the hollow piston, the seal, and the biasing member form internal components of the valve, and wherein the internal components are removable as a unit.

23. The valve of claim 17 wherein the inlet is exposed to the fluid under a first pressure and the outlet is exposed to the fluid under a second pressure, the valve body, the piston, the seal, the biasing member, and the piston seat being sized and configured to provide a fluid flow through the flow passageway with a substantially constant flow rate independent of fluctuations in the second pressure at the outlet.

24. The valve of claim 17 wherein the hollow piston includes a head positioned to contact the seal and a sleeve projecting from the head, the sleeve having a first portion with a first diameter and a second portion with a second diameter different than the first diameter, the second portion being sized and positioned so that at least a section of the second portion is movable within the piston seat throughout at least a portion of a stroke of the piston.

25. The valve of claim 24 wherein the first portion of the sleeve is between the head and the second portion of the sleeve, wherein the first diameter is greater than the second diameter, and wherein the valve further comprises at least one stop attached to the piston seat to limit the range of motion of the piston.

26. The valve of claim 24 wherein the second portion is sized and positioned so that the at least a section of the second portion is movable within the piston seat throughout the stroke of the piston.

27. The valve of claim 17 wherein the hollow piston includes a head positioned to contact the seal and a sleeve projecting from the head, the sleeve having a first portion with a first diameter and a second portion with a second diameter different than the first diameter, the second portion having a plurality of legs defining openings through which fluid flows.

28. The valve of claim 27 wherein the piston is movable along an axis, and wherein the individual legs have a proximal portion with a first dimension transverse to the axis and a distal portion with a second dimension transverse to the axis, the second dimension being less than the first dimension to reduce the rate at which the area of the openings decreases as the valve closes.

29. The valve of claim 17 wherein the reference pressure passageway includes a restriction to limit the fluid flow rate between the second chamber and the inlet.

30. A flow control valve, comprising:
a valve body having an inlet, an outlet, a flow passageway coupling the inlet to the outlet, and a cavity intersecting the flow passageway, the cavity having a first chamber and a second chamber;
a hollow piston disposed within the first chamber;
a diaphragm seal configured to engage the piston, the diaphragm seal having a first convolution radially outside the piston and a second convolution radially inside the piston, the second convolution having a midpoint circumscribing a first effective inner area, the diaphragm seal separating the first and second chambers;
a biasing member configured to urge the hollow piston toward the second chamber;
a reference pressure passageway in fluid communication with the inlet and the second chamber; and
a piston seat positioned at least proximate to the piston, the piston seat surrounding a second effective inner area at least approximately equal to the first effective inner area.

31. The valve of claim 30 wherein the hollow piston, the seal, and the biasing member form internal components of the valve, and wherein the internal components are removable as a unit.

32. The valve of claim 30 wherein the hollow piston includes a head adjacent to the seal and a sleeve projecting from the head, the sleeve having an end portion adjacent to the piston seat.

33. The valve of claim 30 wherein the inlet is exposed to the fluid under a first pressure and the outlet is exposed to the fluid under a second pressure, the valve body, the piston, the seal, the biasing member, and the piston seat being sized and configured to provide a fluid flow through the flow passageway with a substantially constant flow rate independent of fluctuations in the second pressure at the outlet.

34. The valve of claim 30 wherein the hollow piston includes a head positioned to contact the seal and a sleeve projecting from the head, the sleeve having a first portion with a first diameter and a second portion with a second diameter different than the first diameter, the second portion being sized and positioned so that at least a section of the second portion is movable within the piston seat throughout at least a portion of a stroke of the piston.

35. The valve of claim 34 wherein the first portion of the sleeve is between the head and the second portion of the sleeve, wherein the first diameter is greater than the second diameter, and wherein the valve further comprises at least one stop attached to the piston seat to limit the range of motion of the piston.

36. The valve of claim 34 wherein the second portion is sized and positioned so that the at least a section of the second portion is movable within the piston seat throughout the stroke of the piston.

37. The valve of claim 30 wherein the hollow piston includes a head positioned to contact the seal and a sleeve projecting from the head, the sleeve having a first portion with a first diameter and a second portion with a second diameter different than the first diameter, the second portion having a plurality of legs defining openings through which fluid flows.

38. The valve of claim 37 wherein the piston is movable along an axis, and wherein the individual legs have a proximal portion with a first dimension transverse to the axis and a distal portion with a second dimension transverse to the axis, the second dimension being less than the first dimension to reduce the rate at which the area of the openings decreases as the valve closes.

39. The valve of claim 30 wherein the reference pressure passageway includes a restriction to limit the fluid flow rate between the second chamber and the inlet.

40. A flow control valve for providing a substantially constant flow of fluid through the valve, comprising:
- a valve body having an inlet, an outlet, a flow passageway coupling the inlet to the outlet, and a cavity intersecting the flow passageway;
- a hollow piston;
- a diaphragm seal having a perimeter portion, a central portion, and an annular portion between the perimeter and central portions, the annular portion having an effective inner diameter, the diaphragm seal separating the cavity into a first chamber and a second chamber, the hollow piston being disposed in the first chamber at least proximate to the annular portion;
- a biasing member configured to urge the hollow piston toward the second chamber;
- a reference pressure passageway in fluid communication with the inlet and the second chamber; and
- a piston seat configured to selectively engage the hollow piston, the piston seat having an effective inner diameter at least approximately equal to the effective inner diameter of the annular portion of the diaphragm seal.

41. The valve of claim 40 wherein the annular portion of the diaphragm seal comprises a first convolution radially outside the hollow piston and a second convolution radially inside the piston.

42. The valve of claim 40 wherein the hollow piston includes a head adjacent to the seal and a sleeve projecting from the head, the sleeve having an end portion adjacent to the piston seat.

43. The valve of claim 40 wherein the hollow piston, the seal, and the biasing member form internal components of the valve, and wherein the internal components are removable as a unit.

44. The valve of claim 40 wherein the inlet is exposed to the fluid under a first pressure and the outlet is exposed to the fluid under a second pressure, the valve body, the piston, the seal, the biasing member, and the piston seat being sized and configured to provide a fluid flow through the flow passageway with a substantially constant flow rate independent of fluctuations in the second pressure at the outlet.

45. The valve of claim 40 wherein the hollow piston includes a head positioned to contact the seal and a sleeve projecting from the head, the sleeve having a first portion with a first diameter and a second portion with a second diameter different than the first diameter, the second portion being sized and positioned so that at least a section of the second portion is movable within the piston seat throughout at least a portion of a stroke of the piston.

46. The valve of claim 45 wherein the first portion of the sleeve is between the head and the second portion of the sleeve, wherein the first diameter is greater than the second diameter, and wherein the valve further comprises at least one stop attached to the piston seat to limit the range of motion of the piston.

47. The valve of claim 45 wherein the second portion is sized and positioned so that the at least a section of the second portion is movable within the piston seat throughout the stroke of the piston.

48. The valve of claim 40 wherein the hollow piston includes a head positioned to contact the seal and a sleeve projecting from the head, the sleeve having a first portion with a first diameter and a second portion with a second diameter different than the first diameter, the second portion having a plurality of legs defining openings through which fluid flows.

49. The valve of claim 48 wherein the piston is movable along an axis, and wherein the individual legs have a proximal portion with a first dimension transverse to the axis and a distal portion with a second dimension transverse to the axis, the second dimension being less than the first dimension to reduce the rate at which the area of the openings decreases as the valve closes.

50. The valve of claim 40 wherein the reference pressure passageway includes a restriction to limit the fluid flow rate between the second chamber and the inlet.

* * * * *